(12) United States Patent
Lim et al.

(10) Patent No.: US 7,745,996 B2
(45) Date of Patent: Jun. 29, 2010

(54) DISPLAY PANEL FILM HAVING A BLACK LAYER AND A REFLECTIVE LAYER

(75) Inventors: Sung-hwan Lim, Suwon-si (KR); Jeong-ho Nho, Suwon-si (KR); Seok-il Yoon, Daejeon (KR); Wook-jae Jeon, Suwon-si (KR); Dae-hee Lee, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 517 days.

(21) Appl. No.: 11/703,696

(22) Filed: Feb. 8, 2007

(65) Prior Publication Data
US 2008/0007835 A1 Jan. 10, 2008

(30) Foreign Application Priority Data
Jul. 7, 2006 (KR) .............. 10-2006-0064105

(51) Int. Cl.
H01J 17/49 (2006.01)
(52) U.S. Cl. ..................... 313/582; 313/110
(58) Field of Classification Search ......... 313/582–587, 313/110–112; 427/421
See application file for complete search history.

(56) References Cited

U.S. PATENT DOCUMENTS

| 2004/0248048 | A1 | 12/2004 | Lee | |
| 2005/0152032 | A1* | 7/2005 | Olofson et al. | 359/453 |
| 2005/0236949 | A1 | 10/2005 | Hong et al. | |
| 2006/0066945 | A1 | 3/2006 | Yeo et al. | |
| 2006/0099333 | A1 | 5/2006 | Cheong et al. | |
| 2007/0108881 | A1* | 5/2007 | Choi et al. | 313/110 |

FOREIGN PATENT DOCUMENTS

| EP | 1406288 A2 | 4/2004 |
| EP | 1677336 A2 | 7/2006 |
| JP | 62193040 A | 8/1987 |
| JP | 11-260269 A | 9/1999 |
| JP | 11-282363 A | 10/1999 |
| JP | 2000-059083 A | 2/2000 |
| JP | 2005-084477 A | 3/2005 |
| JP | 2006-030844 A | 2/2006 |
| KR | 10-2001-0113159 A | 12/2001 |
| KR | 10-2003-0038833 A | 5/2003 |
| KR | 10-2005-0104021 A | 11/2005 |
| WO | WO 03100810 A1 | 12/2003 |

OTHER PUBLICATIONS

Complete translation of 10-2005-0104021.*

* cited by examiner

Primary Examiner—Joseph L Williams
(74) Attorney, Agent, or Firm—Sughrue Mion, PLLC

(57) ABSTRACT

A film adhered on a display panel includes a black layer for preventing an external light from entering into the display panel, and a reflective layer for preventing light emitted from the display panel from being absorbed in the black layer. The film minimizes the influence of an external light and improves transmittance, thereby providing a user with a good-quality picture.

21 Claims, 5 Drawing Sheets

FIG. 9

DISPLAY PANEL FILM HAVING A BLACK LAYER AND A REFLECTIVE LAYER

CROSS-REFERENCE TO RELATED APPLICATIONS

This application claims the benefit under 35 U.S.C. § 119 (a) of Korean Patent Application No. 2006-64105, filed Jul. 7, 2006, the entire contents of which are hereby incorporated by reference.

BACKGROUND OF THE INVENTION

1. Field of the Invention

The present invention relates to a display panel. More particularly, the present invention relates to a filter which is attached to a plasma display panel, and a plasma display panel having the filter.

2. Description of the Related Art

In general, a plasma display panel (PDP) is a device that displays an image using electric discharge. Such a plasma display panel has become very popular because the plasma display panel has a superior display performance in luminance and viewing angle than other display devices.

The plasma display panel is classified into a facing discharge type and a surface discharge type depending on the arrangement of electrodes. In the facing discharge plasma display panel, a pair of sustaining electrodes is provided on upper and lower substrates, and discharge is generated in a vertical direction of the panel. On the other hand, in the surface discharge plasma display panel, a pair of sustaining electrodes is provided on one substrate, and an electric discharge occurs on the surface of the substrate.

Although it has a high luminous efficiency, the facing discharge plasma display panel has the disadvantage that phosphors easily deteriorate due to the electrical discharge. Recently, the surface discharge plasma display panel has been mainly used.

Figure 1:
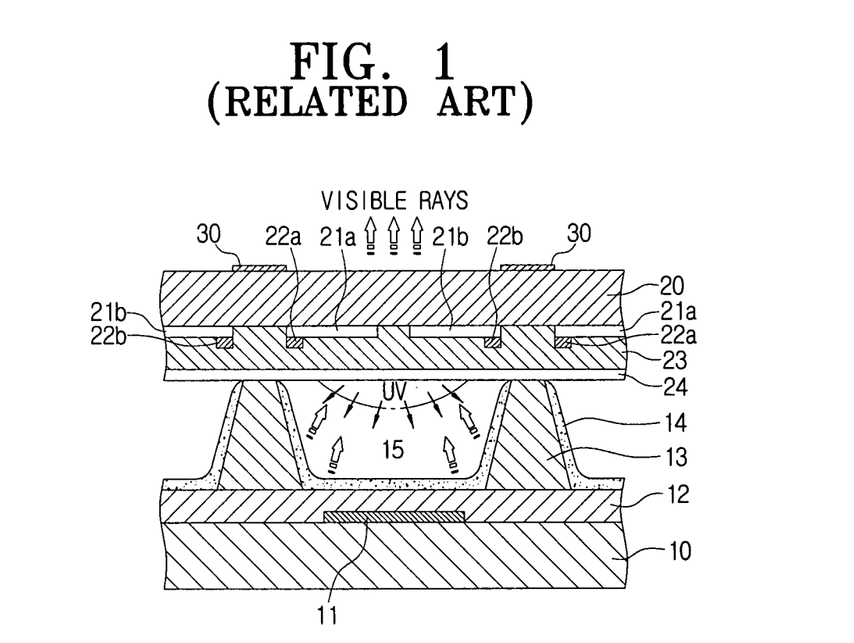
FIG. 1 is a view illustrating the construction of a general plasma display panel.

FIG. 1 is a view illustrating the construction of a general plasma display panel. The plasma display panel shown in FIG. 1 is a surface discharge plasma display panel. In order to easily illustrate the internal construction of the plasma display panel, a part of the plasma display panel is cut, and only an upper substrate 20 is rotated at right angle with respect to a lower substrate 10.

A plurality of address electrodes 11 are arranged in stripes on the upper surface of the lower substrate 10. The address electrodes 11 are embedded in a first dielectric layer 12 made of white dielectric material. A plurality of partitions 13 are provided at a predetermined interval on the upper surface of the first dielectric layer 12 in order to prevent electrical or optical crosstalk among discharge cells 15. A fluorescent layer 14 is coated on the inner surface of the respective discharge cells 15 defined by the partitions 13, and the discharge cells 15 are filled with a discharged gas which is generally a mixture of Ne and Xe, to generate the plasma discharge.

The upper substrate 20 is a transparent substrate, mainly made of glass, allowing visible light to pass. The upper substrate 20 is sealingly assembled to the lower substrate 10 with the partitions 13 formed thereon. On the lower surface of the upper substrate 20, pairs of sustaining electrodes 21a and 21b are provided in stripes in a direction perpendicular to the address electrodes 11. The sustaining electrodes 21a and 21b are made of transparent conductive material such as indium tin oxide (ITO). Bus electrodes 22a and 22b made of metal are provided on the lower surfaces of the sustaining electrodes 21a and 21b, so as to reduce line resistance thereof, and have a width narrower than that of the sustaining electrodes 21a and 21b. The sustaining electrodes 21a and 21b and the bus electrodes 22a and 22b are embedded in a second transparent dielectric layer 23. A protective layer 24 is formed on the lower surface of the second dielectric layer 23, and serves to prevent the second dielectric layer 23 from damage due to sputtering of plasma particles and also to reduce discharge voltage and sustaining voltage by emitting secondary electrons. The protective layer 24 is generally made of magnesium oxide (MgO).

A plurality of black stripes 30 are formed on the upper surface of the upper substrate 20 to prevent light from entering the interior of the plasma display panel from the outside of the panel. The black stripes 30 are formed parallel with the sustaining electrodes 21a and 21b at regular intervals.

With the above arrangement of the plasma display panel, the address discharge is generated between any one of the sustaining electrodes 21a and 21b and the address electrode 11. During this address discharge, wall charges are generated. Then, the sustaining discharge is generated due to the potential difference between the pair of sustaining electrodes 21a and 21b, and thus UV light is generated from the discharged gas. The fluorescent layer 14 is excited by the UV light to emit visible light. The visible light passing through the upper substrate 20 forms an image which can be seen by human eyes.

Figure 2:
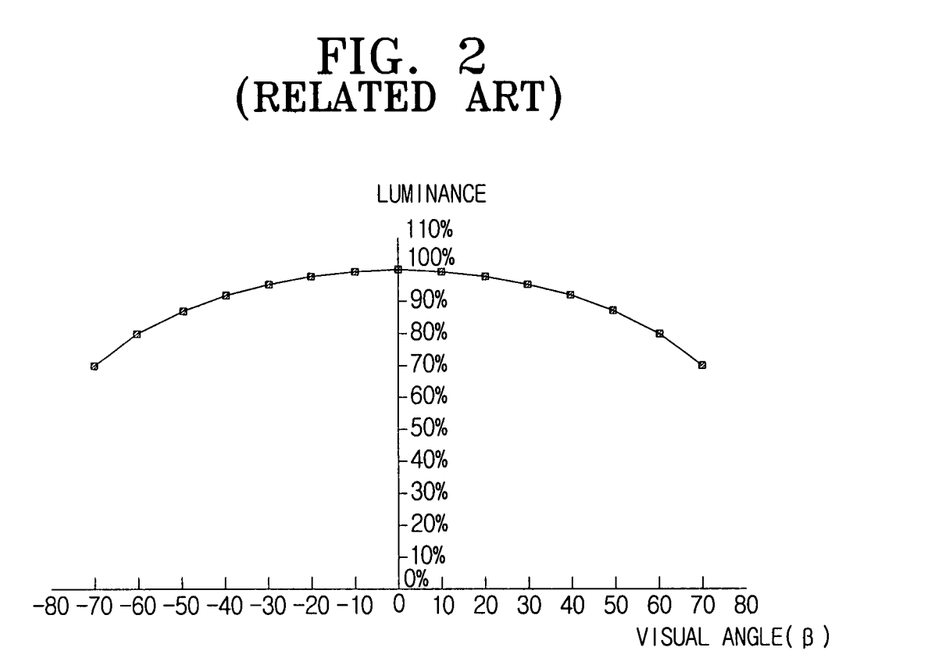
FIG. 2 is a graph depicting an optical characteristic of a conventional plasma display panel.

FIG. 2 is a graph illustrating an optical characteristic of a conventional plasma display panel.

FIG. 2 is a profile depicting a luminance distribution depending on a viewing angle $\beta$ of the visible light emitted from the discharge cells 15. The visible light generated from the discharge cells 15 of the plasma display panel are diffused light emitted in all directions, and thus the luminance distribution of the diffused light is varied as a function of the viewing angle $\beta$.

In the conventional plasma display panel as described above, the external light enters the interior of the discharge cell 15 or is reflected from the upper substrate 20 under bright room conditions, and this causes a bright room to deteriorate the contrast. Further, since the visible light generated from the discharge cell 15 are diffused light having no uniform direction, as shown in FIG. 2, its transmittance deteriorates, and thus the screen display ability of the plasma display panel is depreciated.

SUMMARY OF THE INVENTION

Illustrative, non-limiting exemplary embodiments of the present invention overcome the above disadvantages, and other disadvantages not described above.

An apparatus consistent with the present invention provides a plasma display panel which can improve a bright room contrast by collecting and emitting visible light generated from a discharge cell and minimizing an influence of an external light, so that a user can see a fine quality of an image.

An apparatus consistent with the present invention also provides a filter and a film adapted to a plasma display panel which can improve a bright room contrast by maintaining a high-efficiency transmission characteristic with respect to diffused light generated from the plasma display panel and maximizing a reflective function to an external light.

The foregoing and other objects and advantages are substantially realized by providing a film adhered on a display panel, according to embodiments of the present invention, which comprises a black layer for preventing an external light from entering into the display panel, and a reflective layer for preventing light emitted from the display panel from being absorbed in the black layer.

The film may further comprise a light guide for refracting the light emitted from the display panel and emitting the light in a vertical direction with respect to the display panel. The light guide has a circular light incident surface to which the light emitted from the display panel is incident, and a hemispheric light exiting surface from which the incident light is exited. The light guide may be formed in a hemispherical shape.

The film may further comprise a light guide for collecting and emitting the light emitted from the display panel. An interface of the light guide may be coated with a reflective material.

According to another aspect of the present invention, there is provided a display panel which comprises an upper substrate through which light used for an image display passes, a black layer, formed on an upper surface of the upper substrate, for preventing an external light from entering into the display panel, and a reflective layer for preventing light emitted from the display panel from being absorbed in the black layer.

The display panel may further comprise a light guide for refracting the light emitted from the display panel and emitting the light in a vertical direction with respect to the display panel. The light guide has a circular light incident surface to which the light emitted from the display panel is incident, and a hemispheric light exiting surface from which the incident light is exited. The light guide may be formed in a hemispherical shape.

According to another aspect of the present invention, there is provided a plasma display panel which comprises an upper substrate through which light emitted from a discharge cell passes, a black layer, formed on an upper surface of the upper substrate, for preventing an external light from entering into the display panel, and a reflective layer for preventing light emitted from the discharge cell from being absorbed in the black layer.

Further, according to another aspect of the present invention, there is provided a filter for filtering a video output of a display device which comprises a black layer for preventing an external light from entering into the display device, and a reflective layer for preventing light emitted from the display device from being absorbed in the black layer.

The filter may further comprise a light guide for refracting the light emitted from the display device and emitting the light in a vertical direction with respect to the display device. The light guide has a circular light incident surface to which the light emitted from the display panel is incident, and a hemispheric light exiting surface from which the incident light is exited. The light guide may be formed in a hemispherical shape.

The filter may further comprise an EMI shielding part for shielding an electromagnetic interference (EMI). The EMI shielding part may be formed in a mesh shape or as a conductive film.

The filter may further comprise an anti-reflection part for preventing reflection of an external light. The anti-reflection part may be made of an anti-reflective film.

The filter may further comprise a near-infrared filtering part for filtering near infrared light contained in the light which is transmitted through the display device. The filter may further comprise a glass substrate for reinforcing rigidity of the filter.

BRIEF DESCRIPTION OF THE DRAWING FIGURES

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF THE EXEMPLARY EMBODIMENTS

The matters defined in the description such as a detailed construction and elements are provided to assist in a comprehensive understanding of the exemplary embodiments of the invention and are merely exemplary. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Hereinafter, certain exemplary embodiments of the present invention will be described in detail with reference to the accompanying drawing figures.

Figure 3:
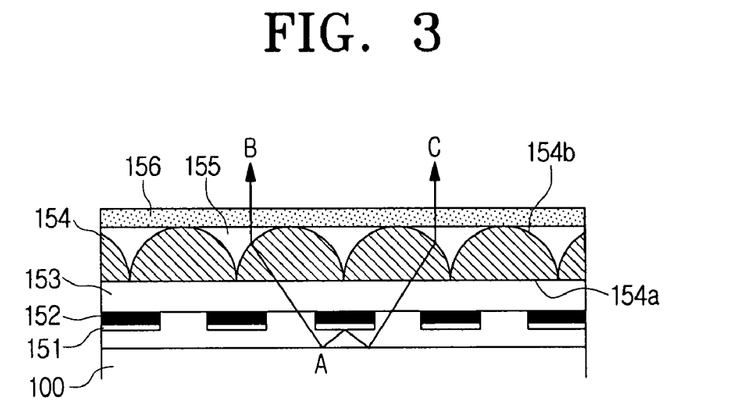
FIG. 3 is a view illustrating a film used in a plasma display panel according to an exemplary embodiment of the present invention.

FIG. 3 is a view illustrating a film used in a plasma display panel according to an exemplary embodiment of the present invention.

Referring to FIG. 3, the film according to an exemplary embodiment of the present invention comprises a reflective layer 151, a black layer 152, adhesive layers 153 and 156, a light guide 154, and a low-refractive medium (space) 155.

The light guide 154 is formed in a hemispherical shape to refract visible light diffused from the plasma display panel at a predetermined angle and emit the same outwardly. More specifically, a light incident surface 154a of the light guide 154 is formed in a circular shape, and a light exiting surface 154b is formed in a hemispherical shape. Consequently, most of the lights diffused from a plasma display panel 100 are exited in a vertical direction with respect to the plasma display panel 100.

The low-refractive medium 155 is formed to enclose the hemisphere-shaped light guide 154, as shown in FIG. 3. The light incident onto the light guide 154 having a high index of refraction is refracted at an interface between the light guide and the low-refractive medium 155 and is outwardly exited. The low-refractive medium 155 may include a gas such as air, or may form a vacuum.

The black layer 152 is adhered in stripes on the lower surface of the light guide 154 by the adhesive layer 153 made of PET (Polyethylene Terephthalate) resin. The black layer 152 is made of carbon black to absorb the external light, thereby preventing the external light from entering into the plasma display panel 100. The reflective layer 151 is formed on the lower surface of the black layer 152 to prevent the visible light diffused from the plasma display panel 100 from being absorbed by the black layer 152.

The diffused light A emitted from the plasma display panel 100 is refracted at the interface between the light guide 154 and the low-refractive medium 155 and is outwardly exited, as direct light B. Otherwise, after the diffused light A is not absorbed in the black layer 152 and is thus reflected by the reflective layer 151, it is again reflected by the plasma display panel 100 and is then exited, as reflective light C. As a result, the black layer 152 with the reflective layer 151 prevents the external light from entering into the plasma display panel 100. Further, the black layer 152 prevents that the visible light diffused from the plasma display panel 100 is disappeared, thereby exiting the visible light outwardly and thus improving the transmittance of the visible light.

Figure 4:
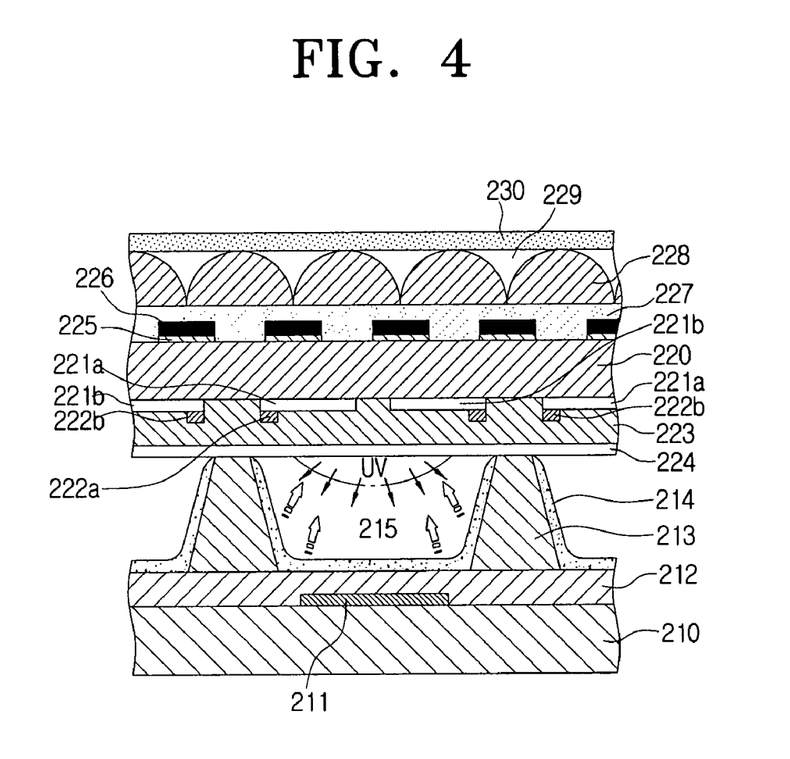
FIG. 4 is a view illustrating a plasma display panel including the film shown in FIG. 3.

FIG. 4 is a view depicting the plasma display panel including the film shown in FIG. 3.

Referring to FIG. 4, the plasma display panel according to an exemplary embodiment of the present invention includes an upper substrate 220 and a lower substrate 210 which are spaced apart from each other. In order to easily illustrate the internal construction of the plasma display panel in FIG. 4, only an upper substrate 220 is rotated at a right angle with respect to the lower substrate 210. A plurality of discharge cells 215 are formed between the upper substrate 220 and the lower substrate 210, and a plasma discharge is generated in the discharge cells 215.

The lower substrate 210 is a glass substrate, and a plurality of address electrodes 211 generating an address discharge are arranged in stripes on the upper surface of the lower substrate 210. A first dielectric layer 212 is formed on the upper surface of the lower substrate 210 to cover the address electrodes 211. The first dielectric layer 212 may be formed by applying a white dielectric material onto the upper surface of the lower substrate 210 to have a predetermined thickness.

A plurality of partitions 213 are provided at a predetermined interval on the upper surface of the first dielectric layer 212. The partitions 213 are arranged in parallel with the address electrodes 211. The partitions 213 define the space between the lower substrate 210 and the upper substrate 220 to form the discharge cells 215 and simultaneously prevent electrical or optical crosstalk among adjacent discharge cells 215. Consequently, the partitions 213 serve to improve color purity. Red (R), green (G), and blue (B) fluorescent layers 214 having a predetermined thickness are coated on the upper surface of the first dielectric layer 212 and the sidewalls of the partitions 213 which form the inner surfaces of the respective discharge cells 215.

The discharge cells 215 are filled with a discharged gas which is generally a mixture of Ne and Xe, to generate the plasma discharge. The fluorescent layers 214 are excited by the UV light generated due to the plasma discharge of the discharged gas, and thus emit visible light having a color corresponding to the respective fluorescent layers 214.

On the lower surface of the upper substrate 220, discharge electrodes 221a and 221b are provided in stripes in a direction perpendicular to the address electrodes 211. As shown in FIG. 1, the discharge electrodes 221a and 221b make a pair, and are made of transparent conductive material such as indium tin oxide (ITO), allowing visible light to pass through the discharge electrodes 221a and 221b.

Bus electrodes 222a and 222b made of metal are provided on the lower surfaces of the discharge electrodes 221a and 221b, and the bus electrodes 222a and 222b make a pair, like the discharge electrodes 221a and 221b. The bus electrodes 222a and 222b are electrodes to reduce the line resistance of the discharge electrodes 221a and 221b, and have a width narrower than that of the discharge electrodes 221a and 221b.

A second dielectric layer 223 is formed to cover the discharge electrodes 221a and 221b and the bus electrodes 222a and 222b. The second dielectric layer 223 may be formed by applying a transparent dielectric material onto the lower surface of the upper substrate 220 to have a predetermined thickness. A protective layer 224 is formed on the lower surface of the second dielectric layer 223, and serves to prevent the second dielectric layer 223 and the discharge electrodes 221a and 221b from damage due to sputtering of plasma particles and also to reduce discharge voltage by emitting secondary electrons. The protective layer 224 is formed by applying magnesium oxide (MgO) onto the lower surface of the second dielectric layer 223 with a predetermined thickness.

With the above arrangement of the plasma display panel, the address discharge is generated between the address electrode 211 and either of the discharge electrodes 221a and 221b. During this address discharge, a wall charge is formed. When AC voltage is applied to the pair of the discharge electrodes 221a and 221b, the sustaining discharge is generated in the discharge cells 215 with the wall discharge formed thereon, and thus UV light is generated from the discharged gas. The fluorescent layer 214 is excited by the UV light to emit visible light.

A black layer 226 is formed in stripes on the upper surface of the upper substrate 220, and is made of carbon black, so as to absorb the external light and thus prevent the external light from entering into the discharge cells 215. A reflective layer 225 is formed on the lower surface of the black layer 226 to prevent the visible light diffused from the discharge cells 215 from being absorbed by the black layer 226. The black layer 226 is adhered onto the light guide 228 by an adhesive layer 227 made of a PET resin.

The light guide 228 is formed in a hemispherical shape to emit most of the visible light diffused from the discharge cells 215 in a vertical direction with respect to the plasma display panel. An adhesive layer 230 made of a PET resin is formed on the upper surface of the light guide 228, and a low-refractive medium 229 is interposed between the light guide 228 and the adhesive layer 230. The visible light incident onto the light guide 228 having a high index of refraction are refracted at the interface between the low-refractive medium 229 and the light guide 228, and are outwardly exited in a vertical direction with respect to the plasma display panel. The low-refractive medium 229 may include a gas such as air, or may form a vacuum.

As described above, by the elements 225, 226, 227, 228, and 229 formed on the upper surface of the upper substrate 220, most of the visible light generated from the discharge cells 215 are outwardly exited, thereby improving transmittance thereof.

Figure 5:
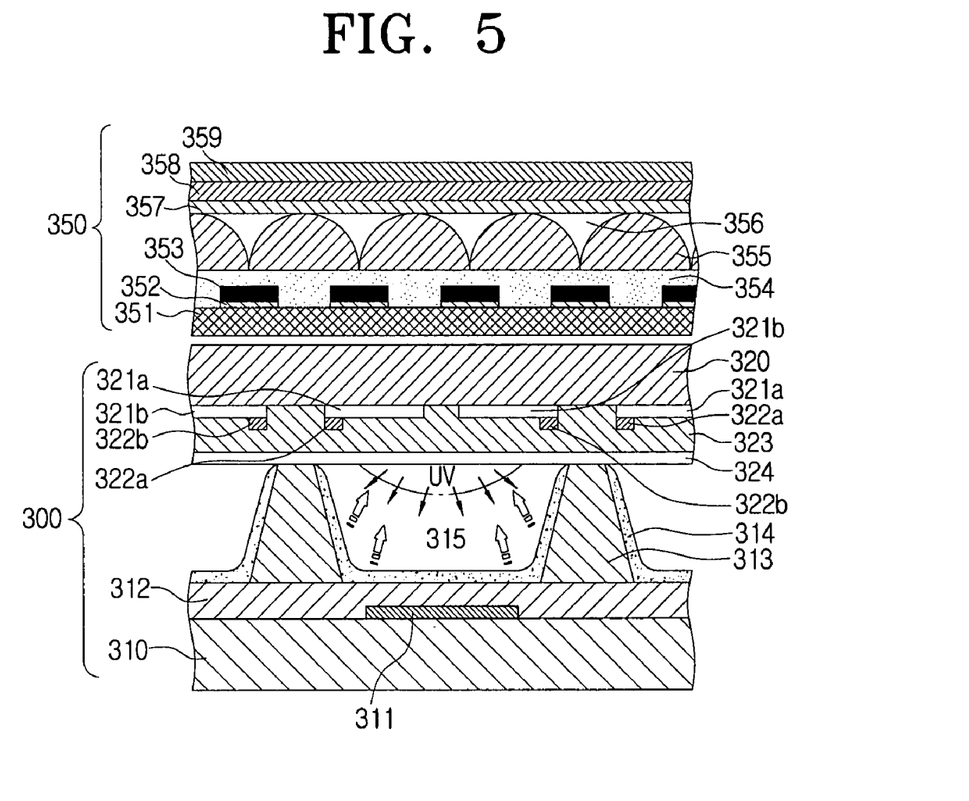
FIG. 5 is a view illustrating a filter including the film shown in FIG. 3.

FIG. 5 is a view illustrating a filter including the film shown in FIG. 3.

The construction of the plasma display panel shown in FIG. 5 is identical to that of the prior art. As shown in FIG. 1, a part of the plasma display panel is cut, and only an upper substrate 320 is rotated at right angle with respect to a lower substrate 310, in order to easily illustrate the construction of the plasma display panel.

An address electrode 311, a first dielectric layer 312, a partition 313, and a phosphor layer 314 are formed on the upper surface of the lower substrate 310, and a pair of sustaining electrodes 321a and 321b, a pair of bus electrodes 322a and 322b, a second dielectric layer 323, and a protective film 324 are formed on the lower surface of the upper substrate 320. The lower substrate 310 and the upper substrate 320 are spaced apart from each other at a predetermined distance to form discharge cells 315.

A filter 350 is formed on the upper surface of the upper substrate 320 to emit the visible light generated from the discharge cells 315 and interrupt the external light. The filter 350 comprises a near-infrared filtering part 351, a reflective layer 352, a black layer 353, an adhesive layer 354, a light guide 355, a low-refractive medium 356, an EMI shielding part 357, a glass substrate 358, and an anti-reflection part 359.

The light guide 355 is formed in a hemispherical shape to emit most of the visible light diffused from the discharge cells 315 in a vertical direction with respect to the plasma display panel. The black layer 353 is adhered in stripes on the lower surface of the light guide 355 by the adhesive layer 354 made of a PET resin. The black layer 353 is made of carbon black to absorb the external light, thereby preventing the external light from entering into the discharge cells 315. The reflective layer 352 is formed on the lower surface of the black layer 353 to prevent the visible light diffused from the discharge cells 315 from being absorbed by the black layer 353.

The near-infrared filtering part 351 interrupts near infrared light slightly longer than visible light generated from the discharge cells 315 and thus improves the color purity. The EMI shielding part 357 for shielding an electromagnetic interference (EMI) is formed in a mesh shape or as a conductive film. The anti-reflection part 359 prevents reflection of the external light so as to prevent dazzling. An anti-reflective film may be used as the anti-reflection part 359.

The glass substrate 358 may be provided on the filter 350 to reinforce the rigidity of the filter 350. The glass substrate 358 is a tempered glass, and minimizes the generation of corrugation on the filter 350 at high temperature. The positions of the near-infrared filtering part 351, the EMI shielding part 357, the glass substrate 358, and the anti-reflection part 359 are not limited to FIG. 5, and may be altered.

The low-refractive medium 356 is formed in a space between the light guide 355 and the layer (e.g., EMI shielding part 357 in FIG. 5) formed on the upper surface of the light guide 355. The low-refractive medium 356 is formed to enclose the hemisphere-shaped light guide 355, as shown in FIG. 5. The visible light incident onto the light guide 355 having a high index of refraction is refracted at an interface between the light guide 355 and the low-refractive medium 356 and is outwardly exited in a vertical direction with respect to a plasma display panel 300. The low-refractive medium 356 may include a gas such as air, or may form a vacuum.

Figure 6:
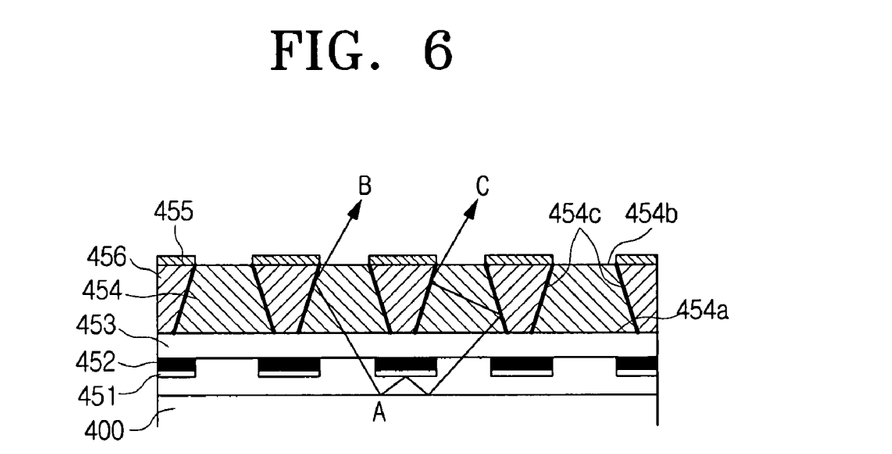
FIG. 6 is a view illustrating a film used in a plasma display panel according to another exemplary embodiment of the present invention.

FIG. 6 is a view illustrating a film used in the plasma display panel according to another exemplary embodiment of the present invention.

Referring to FIG. 6, the film according to another exemplary embodiment of the present invention comprises a reflective layer 451, a black layer 452, an adhesive layer 453, a light guide 454, an external light shielding part 455, and a low-refractive medium (space) 456.

The light guide 454 is formed to collect visible light diffused from the plasma display panel at a predetermined angle and emit the same outwardly. The light guide 454 has a light incident surface 454a wider than a light exiting surface 454b. An external light shielding part 455 is formed on the light exiting surface 454b of the light guide 454 to prevent the external light from entering into the plasma display panel 400. The external light shielding part 455 is made of a low-refractive medium and blackbead.

A space 456, comprising a low-refractive medium, enclosed by the light guide 454 and the external light shielding part 455 is formed in the film. The space 456 may be filled with a gas such as air, or may form a vacuum. The visible light diffused from the plasma display panel 400 are collected and exited by a refractive difference between the light guide 454 having a high index of refraction and the space 456 having a low index of refraction.

The interface 454c of the light guide 454 is coated with silver or aluminum to effectively reflect, collect and emit the visible light diffused from the plasma display panel 400.

The black layer 452 is adhered in stripes on the lower surface of the light guide 454 by the adhesive layer 453 made of a PET resin. The black layer 452 is made of carbon black to absorb the external light, thereby preventing the external light from entering into the plasma display panel 400. The reflective layer 451 is formed on the lower surface of the black layer 452 to prevent the visible light diffused from the plasma display panel 400 from being absorbed by the black layer 452.

The diffused light A emitted from the plasma display panel 400 is outwardly exited, as direct light B. Otherwise, after the diffused light A is not absorbed in the black layer 452 and is thus reflected by the reflective layer 451, it is again reflected by the plasma display panel 400 and is then exited, as reflective light C. As a result, the black layer 452 with the reflective layer 451 can improve the transmittance of the visible light.

Figure 7:
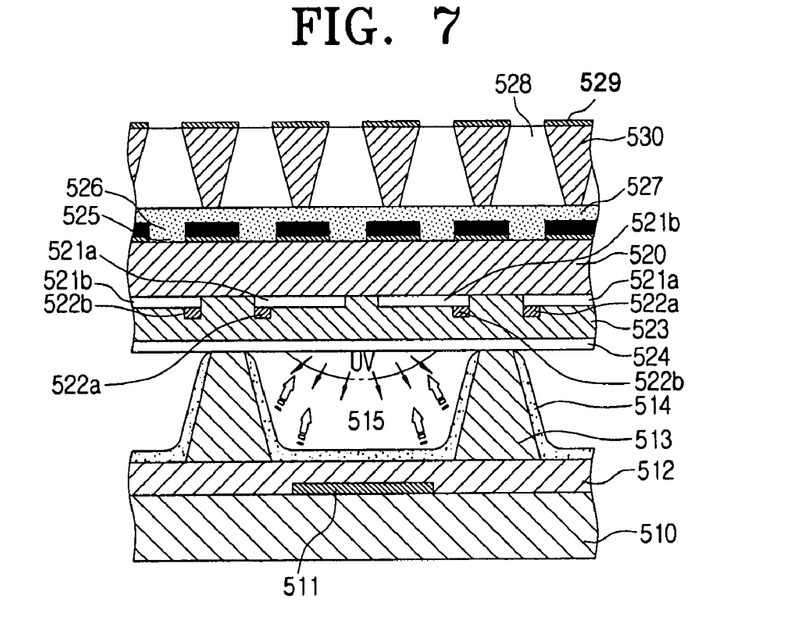
FIG. 7 is a view illustrating a plasma display panel including the film shown in FIG. 6.

FIG. 7 is a view illustrating the plasma display panel including the film shown in FIG. 6.

The internal construction of the plasma display panel shown in FIG. 7 is identical to that shown in FIG. 4. That is, an address electrode 511, a first dielectric layer 512, a partition 513, and a phosphor layer 514 are formed on the upper surface of a lower substrate 510, and a pair of sustaining electrodes 521a and 521b, a pair of bus electrodes 522a and 522b, a second dielectric layer 523, and a protective film 524 are formed on the lower surface of an upper substrate 520. The lower substrate 510 and the upper substrate 520 are spaced apart from each other at a predetermined distance to form discharge cells 515.

A black layer 526 is formed in stripes on the upper surface of the upper substrate 520, and is made of carbon black, so as to prevent the external light from entering into the discharge cells 515. A reflective layer 525 is formed on the lower surface of the black layer 526 to prevent the visible light diffused from the discharge cells 515 from being absorbed by the black layer 526. The black layer 526 is adhered onto the light guide 528 by an adhesive layer 527 made of a PET resin.

The light guide 528 is formed to collect visible light diffused from the discharge cells 515 and emit the same outwardly. The light guide 528 has a light incident surface wider than a light exiting surface. An external light shielding part 529 is formed on the light exiting surface of the light guide 528 to prevent the external light from entering into the discharge cells 515. The external light shielding part 529 is made of a low-refractive medium and blackbead.

A space 530, having a low-refractive medium, enclosed by the light guide 528 and the external light shielding part 529 is formed in the film. The space may be filled with a gas such as air, or may form a vacuum. The visible light diffused from the discharge cells 515 are collected and exited by a refractive difference between the light guide 528 having a high index of refraction and the space 530 having a low index of refraction.

The interface of the light guide 528 and the space 530 is coated with silver or aluminum to effectively reflect, collect and emit the visible light diffused from the discharge cells 515.

The black layer 526 is adhered in stripes on the lower surface of the light guide 528 by the adhesive layer 527 made of a PET resin. The black layer 526 is made of carbon black to absorb the external light, thereby preventing the external light from entering into the discharge cells 515. The reflective layer 525 is formed on the lower surface of the black layer 526 to prevent the visible light diffused from the discharge cells 515 from being absorbed by the black layer 526.

As described above, most of the visible light emitted from the discharge cells 515 are outwardly exited by the elements 525, 526, 527, 528, 529, and 530 formed on the upper surface of the upper substrate 520, thereby improving the transmittance.

Figure 8:
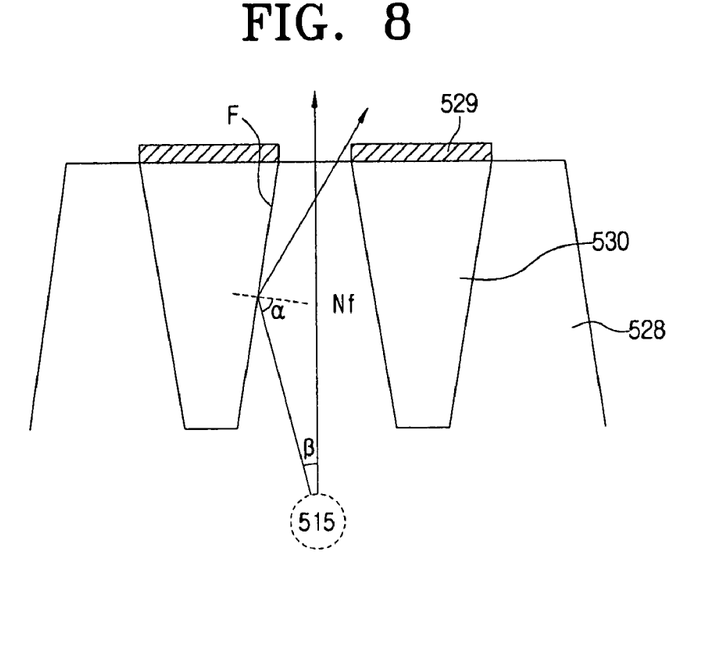
FIG. 8 is a view explaining an optical characteristic of the plasma display panel shown in FIG. 7.

FIG. 8 is a view explaining an optical characteristic of the plasma display panel shown in FIG. 7.

Referring to FIG. 8, a luminance distribution of the diffused light varies, depending on a viewing angle β of the visible light emitted from the discharge cells 515. When visible light enter into the interface F of the light guide 528 at a certain angle from the discharge cell 515, total internal reflection takes place in the interior of the light guide 528, if the incident angle a is larger than a threshold angle θ. In this instance, the threshold angle can be calculated by Equation (1).

$$\theta = \arcsin(Na/Nf) \quad (1)$$

In Equation (1), Na denotes an index of refraction of the space 530, and Nf denotes an index of refraction of the light guide 528.

Figure 9:
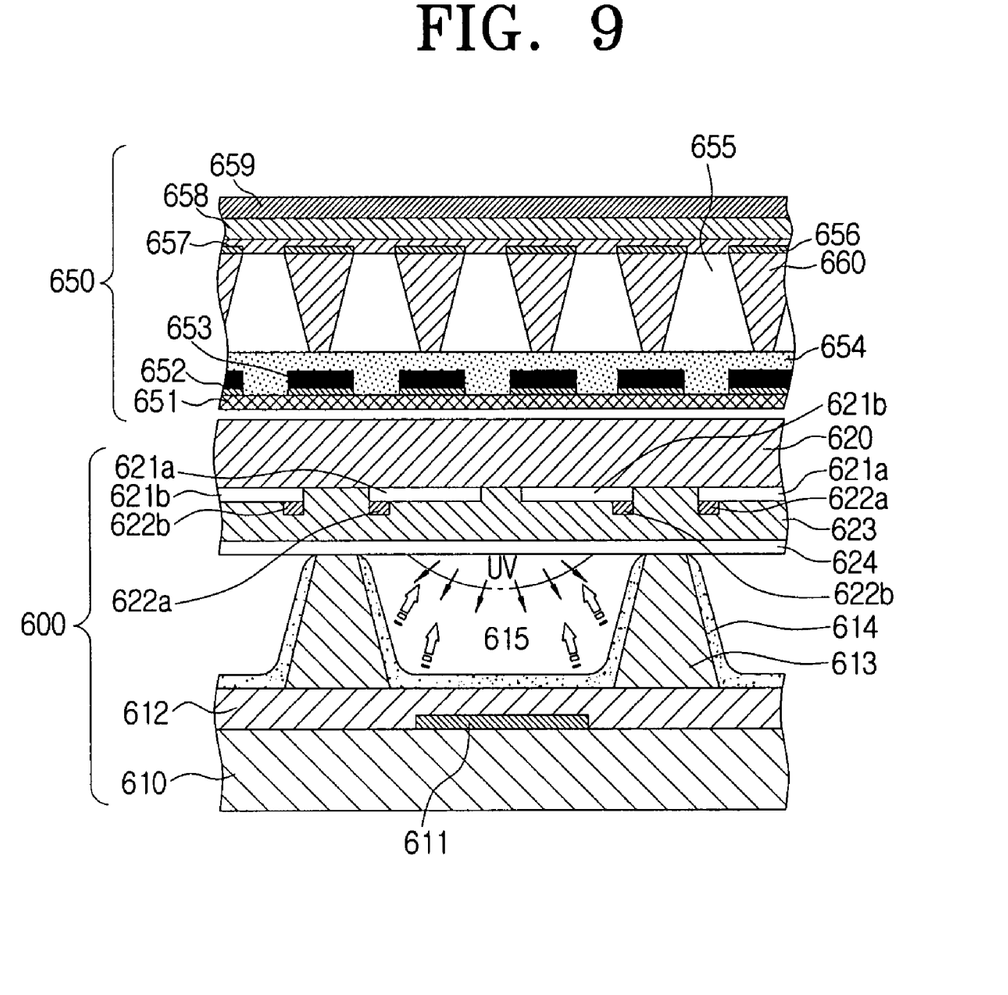
FIG. 9 is a view illustrating a filter including the film shown in FIG. 6.

FIG. 9 is a view illustrating a filter including the film shown in FIG. 6.

The internal construction of the plasma display panel shown in FIG. 9 is identical to that shown in FIG. 5. That is, an address electrode 611, a first dielectric layer 612, a partition 613, and a phosphor layer 614 are formed on the upper surface of a lower substrate 610, and a pair of sustaining electrodes 621a and 621b, a pair of bus electrodes 622a and 622b, a second dielectric layer 623, and a protective film 624 are formed on the lower surface of an upper substrate 620. The lower substrate 610 and the upper substrate 620 are spaced apart from each other at a predetermined distance to form discharge cells 615.

A filter 650 is formed on the upper surface of the upper substrate 620 to emit the visible light generated from the discharge cells 615 and interrupt the external light. The filter 650 comprises a near-infrared filtering part 651, a reflective layer 652, a black layer 653, an adhesive layer 654, a light guide 655, an external light shielding part 656, an EMI shielding part 657, a glass substrate 658, an anti-reflection part 659, and a space 660.

The light guide 655 is formed to collect visible light diffused from the discharge cells 615 and emit the same outwardly. The light guide 655 has a light incident surface wider than a light exiting surface. The external light shielding part 656 is formed on the light exiting surface of the light guide 655 to prevent the external light from entering into the discharge cells 615. The external light shielding part 656 is made of a low-refractive medium and blackbead.

The space 660 enclosed by the light guide 655 and the external light shielding part 656 is formed in the filter 650. The space 660 may be filled with a gas such as air, or may form a vacuum. The visible light diffused from the discharge cells 615 are collected and exited by a refractive difference between the light guide 655 having a high index of refraction and the space 660 having a low index of refraction.

The interface of the light guide 655 and the space 660 is coated with silver or aluminum to effectively reflect, collect and emit the visible light diffused from the discharge cells 615.

The black layer 653 is adhered in stripes on the lower surface of the light guide 655 by the adhesive layer 654 made of a PET resin. The black layer 653 is made of carbon black to absorb the external light, thereby preventing the external light from entering into the discharge cells 615. The reflective layer 652 is formed on the lower surface of the black layer 653 to prevent the visible light diffused from the discharge cells 615 from being absorbed by the black layer 653.

The near-infrared filtering part 651 is to filter or interrupt near infrared light (near infra red) slightly longer than visible light generated from the discharge cells 615 and thus improve the color purity. The EMI shielding part 657 for shielding an electromagnetic interference (EMI) is formed in a mesh shape or as a conductive film. The anti-reflection part 659 prevents reflection of the external light. An anti-reflective film may be used as the anti-reflection part 659.

The glass substrate 658 may be provided to reinforce the rigidity of the filter 650. The glass substrate 658 is a tempered glass, and minimizes the generation of corrugation on the filter 650 at high temperature. The positions of the near-infrared filtering part 651, the EMI shielding part 657, the glass substrate 658, and the anti-reflection part 659 are not limited to FIG. 9, and may be altered.

The space 660, may comprise a low refractive medium, and is formed between the light guide 655 and the layer (e.g., EMI shielding part in FIG. 9) formed on the upper surface of the light guide 655. The space 660 is formed to enclose the trapezoidal-shaped (in cross-section) light guide 655, as shown in FIG. 9. The visible light incident onto the light guide 655 having a high index of refraction is refracted at an interface between the light guide 655 and the space 660 having a low refractive medium, and is outwardly exited. The space 660 may include a gas such as air, or may form a vacuum.

As described above, according to the present invention, by reforming the construction of the upper substrate of the plasma display panel or providing the plasma display panel with the improved filter or film, the bright room contrast can be improved or a fine quality of an image can be provided to a user.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A film adhered on a display panel, the film comprising:
   a light guide for refracting light emitted from the display panel and for emitting the light in a vertical direction with respect to the display panel;
   a black layer for preventing an external light from entering into the display panel, wherein the black layer is adhered on a lower surface of the light guide; and
   a reflective layer for preventing light emitted from the display panel from being absorbed in the black layer, wherein the reflective layer is formed on a lower surface of the black layer.

2. The film of claim 1, wherein the light guide comprises:
   a circular light incident surface to which the light emitted from the display panel is incident; and a hemispheric light exiting surface from which the incident light is exited.

3. The film of claim 1, wherein the light guide is formed in a hemispherical shape.

4. The film of claim 1, wherein an interface of the light guide is coated with a reflective material.

5. The film of claim 4, wherein the interface of the light guide is coated with any one of silver and aluminum.

6. The film of claim 1, wherein the light guide has a light incident surface wider a light exiting surface.

7. A display panel comprising:
   a light guide for refracting the light emitted from the display panel and emitting the light in a vertical direction with respect to the display panel;
   an upper substrate through which light used for an image display passes;
   a black layer, formed on an upper surface of the upper substrate and disposed below the light guide, for preventing an external light from entering into the display panel; and
   a reflective layer for preventing light emitted from the display panel from being absorbed in the black layer, wherein the reflective layer is formed on a lower surface of the black layer.

8. The display panel of claim 7, wherein the light guide comprises:
   a circular light incident surface to which the light emitted from the display panel is incident; and
   a hemispheric light exiting surface from which the incident light is exited.

9. The display panel of claim 7, wherein the light guide is formed in a hemispherical shape.

10. A plasma display panel comprising:
    a light guide for refracting the light emitted from the plasma display panel and emitting the light in a vertical direction with respect to the plasma display panel;
    an upper substrate through which light emitted from a discharge cell passes;
    a black layer, formed on an upper surface of the upper substrate and disposed below the light guide, for preventing an external light from entering into the display panel; and
    a reflective layer for preventing light emitted from the discharge cell from being absorbed in the black layer, wherein the reflective layer is formed on a lower surface of the black layer.

11. A filter for filtering a video output of a display device, comprising:
    a light guide for refracting the light emitted from the display device and emitting the light in a vertical direction with respect to the display device;
    a black layer for preventing an external light from entering into the display device, wherein the black layer is disposed below the light guide;
    a reflective layer for preventing light emitted from the display device from being absorbed in the black layer, wherein the reflective layer is formed on a lower surface of the black layer,
    and a near-infrared filtering part for filtering near infrared light contained in the light which is transmitted through the display device, wherein the near-infrared filtering part is disposed below the reflective layer.

12. The filter of claim 11, wherein the light guide comprises:
    a circular light incident surface to which the light emitted from the display panel is incident; and
    a hemispheric light exiting surface from which the incident light is exited.

13. The filter of claim 11, wherein the light guide is formed in a hemispherical shape.

14. The filter of claim 11, further comprising an electromagnetic interference (EMI) shielding part for shielding an EMI.

15. The filter of claim 14, wherein the EMI shielding part is formed in a mesh shape or as a conductive film.

16. The filter of claim 11, further comprising an anti-reflection part for preventing reflection of an external light.

17. The filter of claim 16, wherein the anti-reflection part is made of an anti-reflective film.

18. The filter of claim 11, further comprising a near-infrared filtering part for filtering near infrared light contained in the light which is transmitted through the display device.

19. The filter of claim 11, further comprising a glass substrate for reinforcing rigidity of the filter.

20. The film of claim 1, wherein a center axis of the black layer and the reflective layer is offset from a center axis of the light guide.

21. The filter of claim 11, wherein a center axis of the black layer and the reflective layer is offset from a center axis of the light guide.

* * * * *